Nov. 23, 1937.  B. N. ASHTON  2,100,154
DISTRIBUTOR VALVE
Filed Nov. 30, 1934

INVENTOR.
Benjamin N. Ashton
BY
Warren P. Hunt
ATTORNEY.

Patented Nov. 23, 1937

2,100,154

UNITED STATES PATENT OFFICE

2,100,154

DISTRIBUTOR VALVE

Benjamin N. Ashton, Bloomfield, N. J., assignor to Eclipse Aviation Corporation, East Orange, N. J., a corporation of New Jersey Application November 30, 1934, Serial No. 755,503

5 Claims. (Cl. 251—107)

This invention relates to fluid distributor valves and more particularly to distributor valves that connect a series of expansible devices with a source of pressure and subsequently connect the same devices with the atmosphere.

Distributor valves embodying the present invention find their chief field of usefulness in connection with airplane de-icer systems in which a series of inflatable members installed on various parts of the airplane are inflated and deflated to break the ice that under certain atmospheric conditions forms on the wings and other structures of the airplane.

An object of the invention is to provide a distributor which may be installed as a unitary assembly in any desirable location upon the apparatus with which it is used.

Another object of the invention is to provide a rotary distributor in which the rotor may be easily adjusted for wear.

Another object of the invention is to provide a rotary distributor in which the pressure of the rotor against its seat in the distributor housing may be regulated and adjusted.

Another object of the invention is to provide a rotary distributor having a tapered rotor seated in the housing, in which the axial pressure of the rotor upon its seat may be controlled and adjusted.

Another object of the invention is to provide a distributor of the tapered rotor type in which the pressure of the rotor against its seat is independent of variations in the axial position of the rotor driving shaft.

A feature of the invention relates to the construction and arrangement of the rotor which is preferably tapered and slidably mounted on its driving shaft, the rotor being spring pressed against an adjustable stop rotatable with the shaft. The spring is also preferably rotatable with the shaft in order to lessen sliding friction between the rotor and its adjacent parts.

Another feature of the invention relates to the combination in a unitary housing of a rotor and a prime mover, such as an electric motor, which is connected with a rotor by a reduction gearing preferably of the worm and gear type in order to give a great reduction in speed without involving the use of large gears.

Other objects and features of the invention will be apparent from the following description in connection with which a preferred embodiment has been shown in the attached drawing in which.

Figures 1, 2:
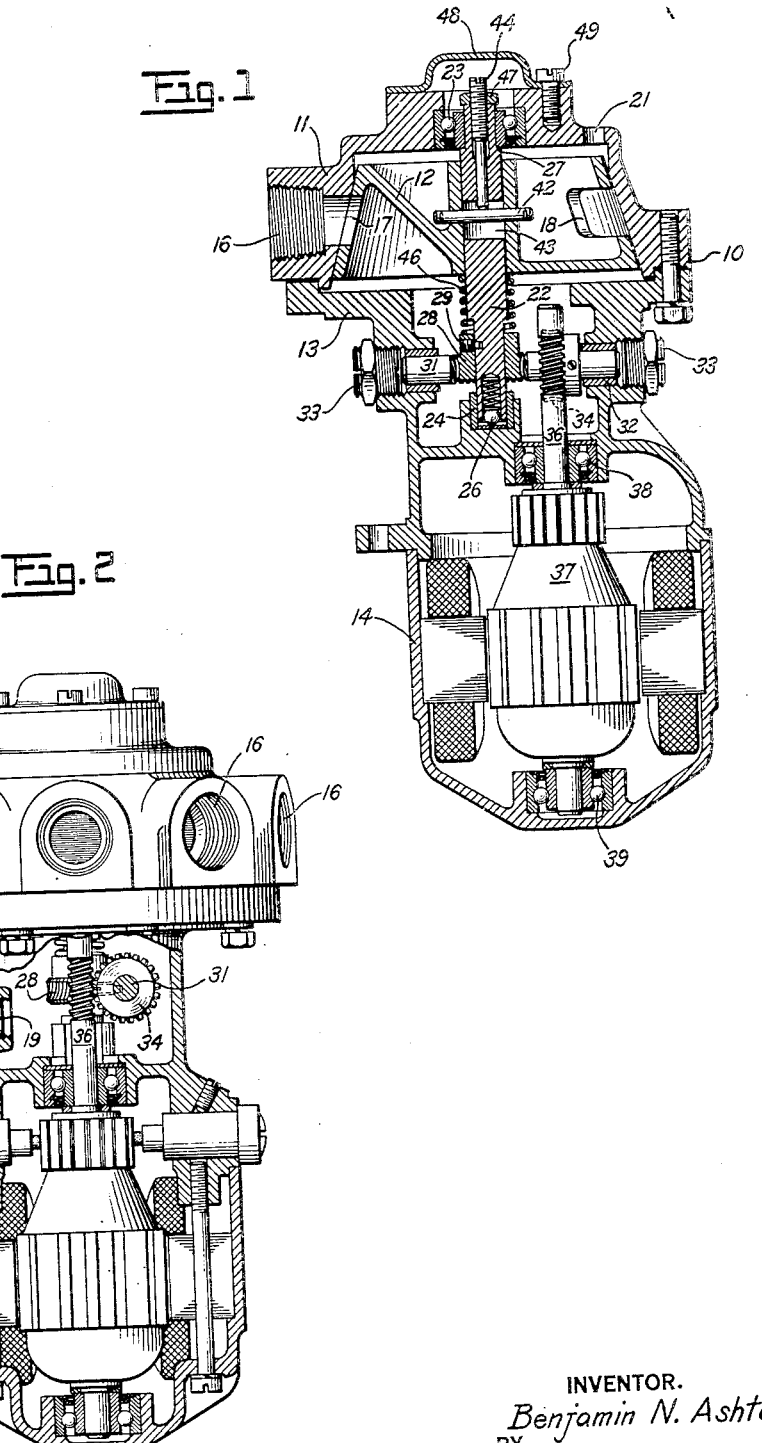
Fig. 1 is a sectional view of the improved distributor valve.
Fig. 2 is a partial sectional view taken on a plane at right angles to the view shown in Fig. 1.

Referring to the drawing, the housing is generally designated at 10 and is preferably formed in three sections. The top section 11 houses the tapered rotor 12, the intermediate section 13 houses the reduction gearing for driving the rotors, and the lower portion 14 houses the electric motor which drives the rotor. The housing portion 11 is provided with a plurality of openings 16 which are adapted to be connected with inflatable members, not shown, for example, rubber shoes which are to be used on de-icer systems for airplanes. Openings 16 are periodically connected with a source of pressure, not shown, through opening 17 in the rotor 12. The fluid under pressure may enter the opening 19 and pass upwardly into the upper portion of the casing from which it is distributed to the various openings 16 by rotation of the rotor. Opening 18 also periodically aligns with openings 16 upon rotation of the rotor and connects the openings with the atmosphere through aperture 21. Rotor 12 preferably is tapered and has a sealing relation with the similar tapered interior portion of the housing 11, the pressure or clearance between the rotor and housing being regulated and controlled by means hereinafter more fully described. The driving shaft 22 is rotatably mounted in the housing at its upper end by bearing 23 which is preferably of the combined radial and thrust type. The lower portion of shaft 22 is rotatably mounted in the housing by bearing 24 and is normally urged against bearing 23 by spring controlled thrust bearing 26, the upward movement of the shaft being limited by shoulder 27. A worm gear 28 is secured to the lower end of the shaft 22 by a screw 29 and meshes with the worm shaft 31 which is mounted in bearings 32 and located laterally by removable plugs 33. Worm shaft 31 is also provided with a worm gear 34 which meshes with worm shaft 36 secured to armature 37 that is mounted in the housing portion 14 by bearings 38 and 39. The double reduction worm gearing provides a very slow motion for the rotor 12, as it is ordinarily desirable to inflate and deflate the de-icer member at a very slow rate of speed.

In order to regulate the pressure of rotor 12 against the housing, the rotor is slidably mounted upon drive shaft 22 and is driven thereby by a pin 42 passing through a slot 43 which is formed in the shaft. An adjustable stop pin 44 is threaded within shaft 22 and has its lower portion contacting the transverse pin 42. Rotor 12 is urged in an upward direction by spring 46 whereby pin 42 is forced into contact with the adjustable stop 44. It may be seen that the pressure or clearance between the rotor and its seat in the housing may be regulated by raising or lowering stop 44 and after the desired pressure or clearance is obtained the stop may be locked by means of nut 47. A cap 48 is preferably provided which is attached to the housing by a screw 49. It will be noted from the above description that the relationship between the rotor 12 and housing may be very accurately determined and that both the adjustable stop 44 and the spring 46 are rotatable with the shaft and rotor. Therefore, neither of them will subject the device to a frictional drag during its operation. It may also be seen that the rotor transmission and driving motor are all combined in a unitary assembly which may be placed in any desired location upon the plane.

While the preferred embodiment of the invention has been illustrated and described, it is understood that this showing and description are illustrative only and the invention is not regarded as limited to the form shown and described, or otherwise, except by the terms of the following claims:

What is claimed is:

1. In a distributor the combination of a housing having inlet and outlet ports and a series of openings, a shaft rotatably mounted in the housing and having a shoulder coacting with the housing for restraining the shaft against axial movement, resilient means urging the shoulder against the housing, a rotor seated in said housing for periodically connecting the openings with the inlet and outlet ports, said rotor being driven by said shaft and slidably mounted thereon, said shaft extending through said rotor and being supported on opposite sides thereof, an adjustable stop threaded in the shaft for positively limiting movement of the rotor on the shaft and maintaining a constant clearance between the rotor and housing in all angular positions of the shaft, and a spring coacting between the shaft and the rotor for urging the rotor against the stop.

2. In a distributor the combination of a housing having inlet and outlet ports and a series of openings, a shaft rotatably mounted in the housing and having a shoulder coacting with the housing for restraining the shaft against axial movement, a rotor seated in said housing for periodically connecting the openings with the inlet and outlet ports, said rotor being driven by said shaft and slidably mounted thereon, said shaft extending through said rotor and being supported on opposite sides thereof, an adjustable stop threaded in the shaft for positively limiting movement of the rotor with respect to the shaft and maintaining a constant clearance between the rotor and housing in all angular positions of the shaft, a spring rotatable with the shaft and coacting between the shaft and the rotor for urging the rotor against the stop, and spring actuated thrust means urging the shoulder against the housing.

3. In a distributor the combination of a housing having inlet and outlet ports and a series of openings, a shaft rotatably mounted in said housing, means restraining axial movement of the shaft, said shaft having a slot therein and an axial opening in communication with the slot, a rotor seated in the housing for periodically connecting said openings with the inlet and outlet ports, said rotor being slidable on said shaft, a member secured to the rotor and passing through said slot, an adjustable stop secured in said opening and rotatable with the shaft and contacting the member for positively limiting axial movement of the rotor for maintaining a constant clearance between the rotor and housing in all angular positions of the shaft, and means resiliently pressing the rotor toward the stop.

4. In a distributor the combination of a housing having inlet and outlet ports and a series of openings, a shaft rotatably mounted in said housing, means restraining axial movement of the shaft, said shaft having a slot therein, a rotor seated in the housing for periodically connecting said openings with the inlet and outlet ports, said rotor being slidable on said shaft, a member secured to the rotor and passing through said slot, an adjustable stop coaxial of and rotatable with the shaft and contacting the member for positively limiting axial movement of the rotor and preventing the same from contacting the housing in all angular positions of the shaft, said shaft having a shoulder below the rotor, and a compression spring coacting between the shoulder and the rotor.

5. In a distributor the combination of a housing having inlet and outlet ports and a series of openings, said housing having a conical interior surface pierced by said openings, a conical rotor mating with said surface for periodically connecting the openings with the inlet and outlet ports, a driving shaft rotatably mounted in the housing and having a slot, means restraining axial movement of the shaft, said rotor being slidable on said shaft, a member secured to the rotor and passing through said slot for driving said rotor, spring means urging the rotor toward the conical surface of the housing, and an adjustable stop rotatable with the shaft and projecting within the slot for positively limiting movement of the rotor toward the conical surface, and means for securing said stop in a predetermined position with respect to the shaft and rotor for maintaining a constant clearance between the housing and rotor in all angular positions of the shaft.

BENJAMIN N. ASHTON.